US012627432B2

(12) United States Patent
Liu

(10) Patent No.: US 12,627,432 B2
(45) Date of Patent: May 12, 2026

(54) DATA TRANSMISSION METHOD AND APPARATUS, COMMUNICATION DEVICE AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 345 days.

(21) Appl. No.: 18/269,938

(22) PCT Filed: Dec. 29, 2020

(86) PCT No.: PCT/CN2020/140737
§ 371 (c)(1),
(2) Date: Jun. 27, 2023

(87) PCT Pub. No.: WO2022/141038
PCT Pub. Date: Jul. 7, 2022

(65) Prior Publication Data
US 2024/0063963 A1 Feb. 22, 2024

(51) Int. Cl.
*H04L 5/00* (2006.01)

(52) U.S. Cl.
CPC ................................. *H04L 5/0048* (2013.01)

(58) Field of Classification Search
None
See application file for complete search history.

(56) References Cited

U.S. PATENT DOCUMENTS

2020/0052827 A1 2/2020 Vilaipornsawai et al.

FOREIGN PATENT DOCUMENTS

| CN | 111953466 A | 11/2020 | |
| CN | 111130728 B * | 8/2023 | ........... H04L 5/0048 |
| WO | WO-2022031617 A1 * | 2/2022 | ........... H04L 5/1469 |

OTHER PUBLICATIONS

PCT/CN2020/140737, English translation of Search Report dated Sep. 17, 2021, 2 pages.
(Continued)

*Primary Examiner* — Maharishi V Khirodhar
(74) *Attorney, Agent, or Firm* — Cozen O'Connor

(57) ABSTRACT

A data transmission apparatus, a data transmission device, and a storage medium implement a method belonging in the technical field of wireless communications, where the method comprises: on the basis of a trigger condition, determining to perform demodulation reference signal (DMRS) sharing during a data transmission process. Thus, on the basis of signal state information received within a continuous period of time, it is determined whether to start a mechanism for terminating data retransmission. Thus, by means of the data transmission method, during a data transmission process, on the basis of a pre-set trigger condition, a plurality of actual repetitions are triggered at an appropriate time to share DMRSs, such that the DMRS overhead is reduced, and more channel resources and transmission power are distributed for data transmission, thereby improving the encoding rate and the coverage of channels.

16 Claims, 4 Drawing Sheets

(56)            References Cited

OTHER PUBLICATIONS

Moderator (China Telecom) "FL summary of PUSCH coverage enhancements", 3GPP TSG RAN WG1 Meeting #103-e, R1-2009320, Nov. 2020, 38 pages.
European Patent Application No. 20967387.0, Search Report and Opinion dated Sep. 6, 2024, 9 pages.
Xiaomi "PUSCH coverage enhancement" 3GPP TSG RAN WG1 #103-e, R1-2007640 ,Oct.-Nov. 2020, 7 pages.
Huawei, et al. "PUSCH enhancements for URLLC" 3GPP TSG RAN WG1 Meeting #96, R1-1901559, Feb.-Mar. 2019, 13 pages.

* cited by examiner determining that a DMRS is shared during a data
transmission process according to a trigger condition ⟋— 101

FIG. 1

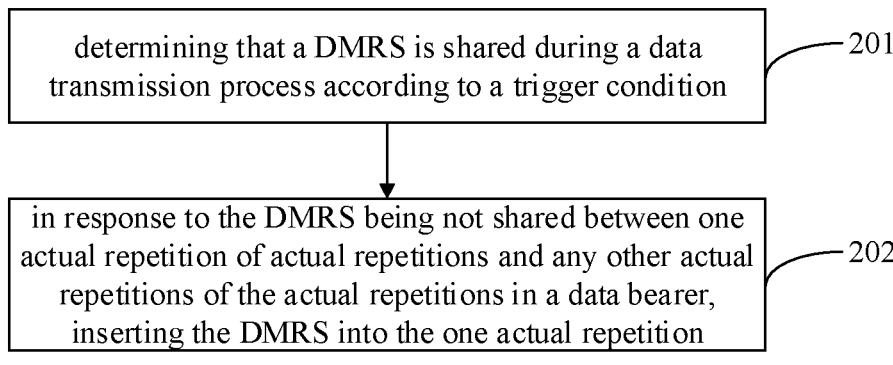

determining that a DMRS is shared during a data transmission process according to a trigger condition ⟍201 in response to the DMRS being not shared between one actual repetition of actual repetitions and any other actual repetitions of the actual repetitions in a data bearer, inserting the DMRS into the one actual repetition ⟍202

FIG. 4

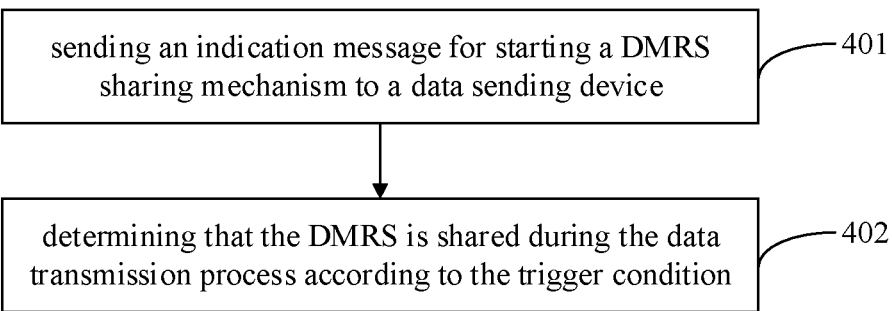

in response to acquiring an indication message for starting a DMRS sharing mechanism sent by a data receiving device, starting the DMRS sharing mechanism, to determine that the DMRS is shared during a data transmission process according to a trigger condition ⟍301

FIG. 5 sending an indication message for starting a DMRS sharing mechanism to a data sending device ⟍401 determining that the DMRS is shared during the data transmission process according to the trigger condition ⟍402

FIG. 6

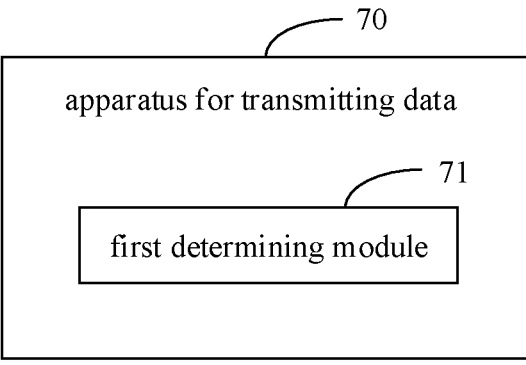

apparatus for transmitting data ⟋70 first determining module ⟋71

FIG. 7

DATA TRANSMISSION METHOD AND APPARATUS, COMMUNICATION DEVICE AND STORAGE MEDIUM

CROSS-REFERENCE TO RELATED APPLICATIONS

The present application is a National Stage of International Application No. PCT/CN2020/140737, filed on Dec. 29, 2020, the contents of which are incorporated herein by reference for all purposes.

FIELD

The present disclosure relates to the field of wireless communication technologies, and more particularly, to a data transmission method and apparatus, a data transmission device and a storage medium.

BACKGROUND

In the field of mobile communication, a Repetition Type B-based transmission between a base station and a user equipment (UE) may go across the time slot during the transmission process or encounter an unavailable symbol during the transmission process. The Repetition Type B introduces the concept of actual repetition for this case where the transmission spans the slot or where a symbol is unavailable during the transmission process. In the Repetition Type B, a transmission refers to a nominal repetition (a nominal transmission), and when the above situation happens to the nominal repetition, the nominal repetition is split into a plurality of actual repetitions by segmentation.

SUMMARY

According to an aspect of embodiments of the present disclosure, there is provided a method for transmitting data, performed by a first data transmission device, and including: determining that a demodulation reference signal (DMRS) is shared during a data transmission process according to a trigger condition.

According to another aspect of embodiments of the present disclosure, there is provided an apparatus for transmitting data, applied to a first data transmission device and including: a first determining module configured to determine that a DMRS is shared during a data transmission process according to a trigger condition.

According to yet another aspect of embodiments of the present disclosure, there is provided a data transmission device, including: a transceiver; a memory; a processor, coupled to the transceiver and the memory, and configured to control the transceiver to send or receive a wireless signal and implement the method as described above by executing computer-executable instructions stored on the memory.

According to a further aspect of embodiments of the present disclosure, there is provided a non-transitory computer-readable storage medium having stored thereon computer-executable instructions that, when executed by a processor, cause the processor to implement the method as described above.

Additional aspects and advantages of the embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the embodiments of the present disclosure will become apparent and more readily appreciated from the following descriptions made with reference to the accompanying drawings, in which:

FIG. 1 is a flowchart of a method for transmitting data provided by embodiments of the present disclosure;

FIG. 4 is a flowchart of another method for transmitting data provided by embodiments of the present disclosure;

FIG. 5 is a flowchart of yet another method for transmitting data provided by embodiments of the present disclosure;

FIG. 6 is a flowchart of a further method for transmitting data provided by embodiments of the present disclosure;

FIG. 7 is a schematic diagram illustrating an apparatus for transmitting data provided by embodiments of the present disclosure;

DETAILED DESCRIPTION

Figure 2:
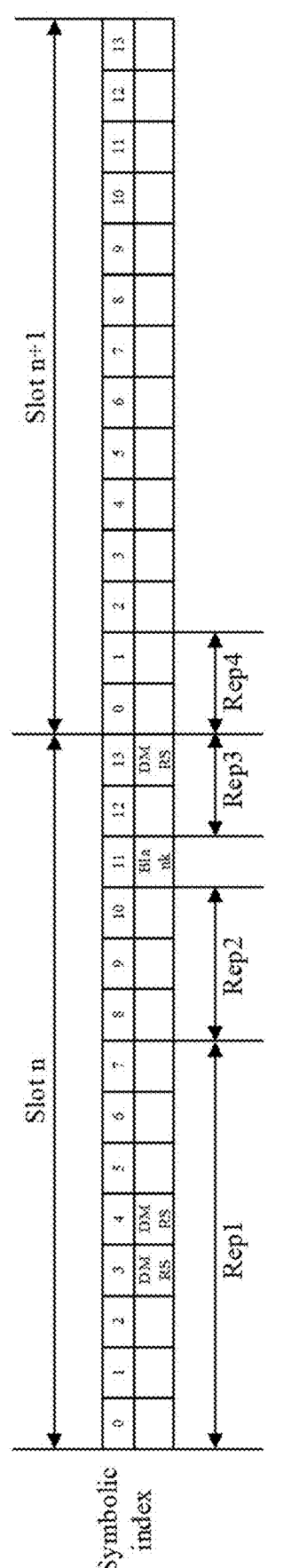
FIG. 2 is a schematic diagram illustrating a plurality of actual repetitions segmented from a same nominal repetition sharing a DMRS.

Embodiments of the present disclosure are described in detail below with reference to examples illustrated in the accompanying drawings. In the drawings, the same or similar elements and the elements having same or similar functions are denoted by the same or similar reference numerals throughout the descriptions. Embodiments described in the following examples do not represent all embodiments that are consistent with the present disclosure, and they are only examples of devices and methods consistent with aspects in the description and the appended claims.

Terms used herein in embodiments of the present disclosure are only for the purpose of describing specific embodiments, but should not be construed to limit the present disclosure. As used in the embodiments of the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of the embodiments of the present disclosure. As used herein, the term "if" may be construed to mean "when" or "upon" or "in response to determining" depending on the context.

Embodiments of the present disclosure are described in detail below with reference to examples illustrated in the accompanying drawings. In the drawings, the same or similar elements and the elements having same or similar functions are denoted by the same or similar reference numerals throughout the descriptions. The embodiments described below with reference to the accompanying drawings are explanatory, and are intended to explain the present disclosure and shall not be construed to limit the present disclosure.

In the related art, when a nominal repetition is split into a plurality of actual repetitions, a new redundancy version (RV) is usually configured for each actual repetition, and a different demodulation reference signal (DMRS) is configured for each actual repetition to facilitate demodulation, and a large number of demodulation reference signals occupy excessive available resources for data transmission and reduces available power for data transmission.

In order to solve the problem in the related art that when a nominal repetition is divided into a plurality of actual repetitions, a different DMRS is configured for each actual repetition, resulting in that the DMRS occupies excessive data transmission resource and data transmission power, embodiments of the present disclosure provide a method for transmitting data.

According to the method for transmitting data provided by the present disclosure, it is determined that that the DMRS is shared during the data transmission process according to the trigger condition. Therefore, during the data transmission process, on the basis of the preset trigger condition, it triggers at an appropriate time that the DMRS is shared by the plurality of actual repetitions, such that the consumption caused by the DMRS is reduced, and more channel resource and transmission power are allocated to the data transmission, thereby improving the code rate and the coverage of the channel.

The data transmission method and apparatus, the data transmission device and the storage medium provided in the present disclosure will be described in detail below with reference to the accompanying drawings.

Figure 1:
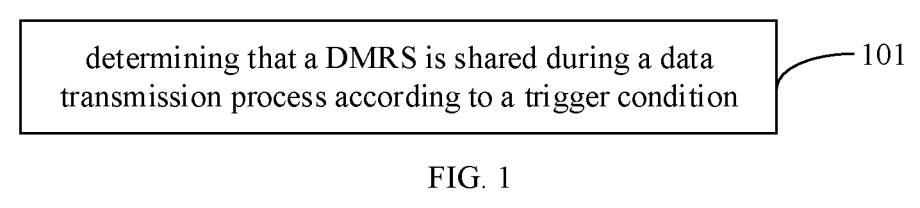

FIG. 1 is a flowchart of a method for transmitting data provided by embodiments of the present disclosure. The method for transmitting data is performed by a first data transmission device.

As shown in FIG. 1, the method for transmitting data includes the following operation.

In block 101, it is determined that a DMRS is shared during a data transmission process according to a trigger condition.

It should be noted that the first data transmission device of the embodiments of the present disclosure may be any base station or UE. A UE may be a device that provides voice and/or data connectivity to a user. The UE may communicate with one or more core networks via a radio access network (RAN). The UE may be an Internet of Things terminal, such as a sensor device, a mobile phone (or referred to as a "cellular" phone) and a computer with an Internet of Things terminal. For example, it may be a fixed, portable, pocket-sized, handheld, built-in computer or vehicle-mounted apparatus. For example, a station (STA), a subscriber unit, a subscriber station, a mobile station, a mobile, a remote station, an access point, a remote terminal, an access terminal, a user terminal, or a user agent. Alternatively, the UE may be a device of an unmanned aerial vehicle. Alternatively, the UE may be a vehicle-mounted device, for example, a driving computer with a wireless communication function, or a wireless communication device externally connected with a driving computer. Alternatively, the UE may be a roadside device, such as a street lamp, a signal lamp or other roadside devices with a wireless communication function.

The trigger condition includes at least one of: a user equipment (UE) being in a specified state, a type of data repetition being a specified type, a channel quality indicator (CQI) being in a first specified range, a signal-to-noise ratio (SNR) being in a second specified range, and a frequency hopping not occurring in a data transmission channel.

As a possible implementation, since the state of the UE may affect the quality of the data interaction between the UE and the base station, a state of the UE may be determined as the specified state for triggering the sharing of the DMRS according to the influence of the state of the UE on the quality of data interaction and actual service requirements. For example, the specified state in which the UE is in may be a mobile state, or a static state, which is not limited in the embodiments of the present disclosure.

As a possible implementation, since the data repetition type of the channel may also affect the state and the quality of the data interaction in the channel, the specified type of the data repetition may be determined according to the influence of the data repetition type on the quality of the data transmission in the channel and actual service requirements, and a condition that the type of the data repetition is the specified type may be set as the specified trigger condition.

As a possible implementation, it may also be determined whether to trigger the sharing of the DMRS according to a state of the channel. Therefore, the timing for triggering the sharing of the DMRS may be determined according to a channel quality indicator such as SNR and CQI of the channel. Therefore, a first specified range of the CQI and a second specified range of the SNR may be determined according to actual demands, and the conditions that the CQI is in the first specified range and/or the SNR in the second specified range may be set as the trigger condition.

As a possible implementation, the premise of sharing the DMRS is that the repetitions are located at the same position in the frequency domain, and the DMRS cannot be shared among different frequency hopping positions. On this basis, the sharing of the DMRS can be triggered in the case where the frequency hopping does not happen to the repetition in the data transmission channel. Therefore, a condition that the frequency hopping does not occur in the data transmission channel may be set as the trigger condition.

As an example, the trigger condition may be taken as default configuration information, and the trigger condition may be pre-configured by the configuration information at the network side.

As an example, the trigger condition may also be configured by a specific indication message, such that the trigger condition is configured in real time during the data transmission process between the first data transmission device and a corresponding terminal. That is, in a possible implementation of the embodiments of the present disclosure, the above-mentioned method for transmitting data may further include: determining the trigger condition according to indication information sent by a second data transmission device. The second data transmission device is a device performing data interaction with the first data transmission device.

The second data transmission device may refer to a device currently exchanging data with the first data transmission device. For example, when the first data transmission device is a UE, the second data transmission device may be a base station; and when the first data transmission device is a base station, the second data transmission device may be a UE.

The indication information is any one of following types of information: radio resource control (RRC) information, a media access control layer (MAC) control element (CE) and downlink control information (DCI).

As a possible implementation, the first data transmission device may receive an indication message sent by the second data transmission device in real time during data interaction with the second data transmission device, and perform parsing processing on the indication message to determine the trigger condition included in the indication message.

It should be noted that in actual applications, the trigger condition may be configured by the base station. Therefore, the solution of configuring the trigger condition via the indication message in the embodiments of the present disclosure may be applied to an application scenario where the first data transmission device is a UE and the second data transmission device is a base station.

In the embodiments of the present disclosure, since the trigger condition may be used to indicate that the sharing of the DMRS may be triggered during the data transmission process, in response to determining that the trigger condition is met, the first data transmission device performs the sharing of the DMRS during the data transmission process. Alternatively, in response to determining that the trigger condition is not met, the first data transmission device determines not to perform the sharing of the DMRS during the data transmission process.

It should be noted that in response to the first data transmission device being a data transmission device and the triggering condition being met, the first data transmission device determines that the plurality of repetitions share the DMRS in a slot, and configuration and insertion of the DMRS for every single repetition are not needed.

Accordingly, in response to determining that the first data transmission device is a data receiving device and the trigger condition is met, the first data transmission device may decode every repetition in the plurality of the repetitions according to the DMRS shared by the plurality of repetitions once first data transmission device acquires data sent by an opposite end via the data transmission channel.

Further, in response to meeting the trigger condition, the first data transmission device may further determine repetitions by which the DMRS is shared according to a corresponding condition. That is, in a possible implementation of the embodiments of the present disclosure, determining that the DMRS is shared during the data transmission process may include: in response to a same nominal repetition including a plurality of actual repetitions in the data transmission process, determining that the DMRS is shared by the plurality of actual repetitions.

As a possible implementation, when a repetition goes cross a slot or there is an unavailable symbol in the transmission process based on the Repetition Type B, a nominal repetition is segmented into a plurality of actual repetitions for retransmission, and each actual repetition is configured with a different DMRS, which may cause the DMRS to occupy too much data transmission resource. Therefore, the DMRS may be allowed to be shared by the plurality of actual repetitions corresponding to the same nominal repetition, such that in response to the same nominal repetition being segmented into the plurality of actual repetitions, that is, in response to the same nominal repetition including the plurality of actual repetitions during the data transmission process, the first data transmission device may determine that the DMRS is shared by the plurality of actual repetitions belonging to the same nominal repetition.

For example, FIG. 2 is a schematic diagram illustrating a plurality of actual repetitions segmented from a same nominal repetition sharing a DMRS. FIG. 2 shows an $n^{th}$ slot and an $(n+1)^{th}$ slot, each slot includes 14 symbol positions, Rep represents repetition, blank represents an unavailable symbol, Rep1 belongs to a nominal repetition, and Rep2, Rep3 and Rep4 are the plurality of actual repetitions split from another nominal repetition. In this case, it is determined that Rep2, Rep3 and Rep4 share a DMRS, and Rep2, Rep3 and Rep4 share a corresponding symbol position of the DMRS in the slot. The position may be determined according to an original configuration in the nominal repetition corresponding to Rep2, Rep3 and Rep4.

It should be noted that, in actual applications, the DMRS may occupy 1 symbol, and it is also possible for the DMRS to occupy 2 to 3 symbols according to actual service requirements, which is not limited in the embodiments of the present disclosure.

Further, in response to meeting the trigger condition, the first data transmission device may further make a plurality of consecutive adjacent repetitions share the DMRS. That is, in a possible implementation of the embodiments of the present disclosure, determining that the DMRS is shared during the data transmission process may include: in response to a plurality of consecutive adjacent actual repetitions during the data transmission process having a length less than or equal to a specified length, determining that the DMRS is shared by the plurality of consecutive adjacent actual repetitions.

As a possible implementation, in response to meeting the trigger condition, the first data transmission device acquires a preset specified length, and in response to the plurality of consecutive adjacent actual repetitions in the data transmission process having the length less than or equal to a specified length, the first data transmission device determines that the DMRS is shared by the plurality of consecutive adjacent actual repetitions.

It should be noted that the specified length may be a default length agreed in advance by the first data transmission device and the second transmission device, or may be configured by an indication message sent from the second data transmission device to the first data transmission device. The indication message may be any one of RRC information, a MAC CE and DCI, which is not limited in the embodiments of the present disclosure.

For example, the first data transmission device is the UE and the second data transmission device is the base station. In response to meeting the trigger condition, the second data transmission device sends the indication message carrying a specified length to the first data transmission device.

Further, the actual repetition length and the specified length may be indicated by different granularities. That is, in a possible implementation of the embodiments of the present disclosure, the length of the actual repetition is one of a length of symbols, a total length of sub-slots, and a total length of slots included in the actual repetition.

As a possible implementation, the actual repetition length and the specified length may be represented by the symbol length. For example, the specified length is a length of 11 symbols, the first data transmission device may determine that the DMRS is shared by the plurality of actual repetition in response to the plurality of actual repetitions having a length less than or equal to 11 symbols.

As another possible implementation, the actual repetition length and the specified length may also be represented by the total length of the sub-slots. For example, 1 sub-slot includes 2 symbols, and the specified length is a length of 5 sub-slots (that is, 10 symbols), then the first data transmission device may determine that the DMRS is shared by a plurality of actual repetitions in response to the plurality of actual repetitions having a length less than or equal to 5 symbols.

As yet another possible implementation, the actual repetition length and the specified length may also be represented by the total length of slots. For example, 1 slot includes 14 symbols, and the specified length is a length of 1 slot (that is, 14 symbols), then the first data transmission device may determine that the DMRS is shared by the plurality of actual repetitions in response to the plurality of actual repetitions having a length less than or equal to 1 slot.

Figure 3:
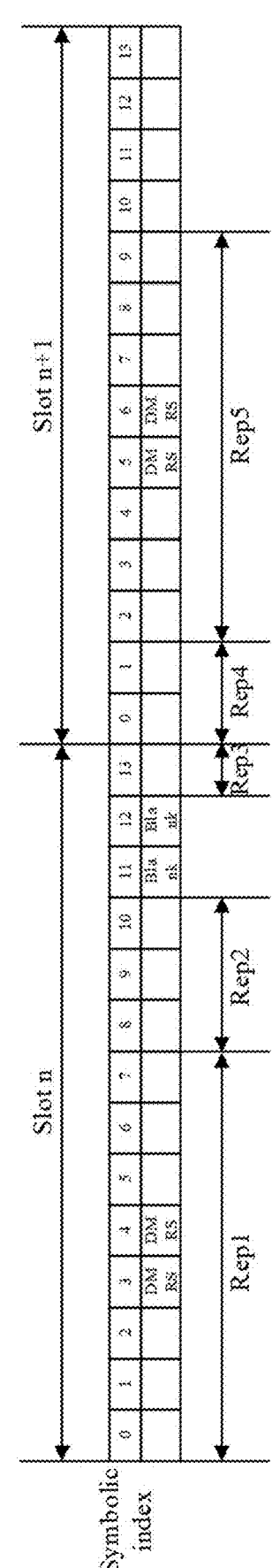
FIG. 3 is a schematic diagram illustrating consecutive adjacent actual repetitions sharing a DMRS.

For example, the specified length is 11 symbols. FIG. 3 is a schematic diagram illustrating consecutive adjacent actual repetitions sharing the DMRS. Rep1 belongs to a nominal repetition, Rep2, Rep3 and Rep4 are the plurality of actual repetitions segmented from the same nominal repetition, and Rep5 belongs to a nominal repetition. The plurality of actual repetitions Rep2, Rep3 and Rep4 segmented from the same nominal repetition may share the DMRS, but since the segmentation occurs and the original location of the DMRS is unavailable and discarded, no DMRS can be used for the sharing. In the case that the DMRS is shared in a symbol granularity, assuming that the specified length is 11 symbols, Rep1 and Rep2 belong to different nominal repetitions, but Rep1 and Rep2 are adjacent continuous actual repetitions, and the length of Rep1 and Rep2 is less than 11 symbols, the first data transmission device determines that Rep1 and Rep2 share the DMRS. Similarly, since Rep3, Rep4, Rep5 are consecutively adjacent repetitions and have a length less than 11 symbols, the first data transmission device determines that Rep3, Rep4 and Rep5 share the DMRS.

According to the method for transmitting data provided by the embodiments of the disclosure, whether the DMRS is shared during the data transmission process is determined according to the trigger condition. Therefore, during the data transmission process, the sharing of the DMRS by the plurality of the actual repetitions is triggered at an appropriate time according to the trigger condition, such that consumption caused by the DMRS is reduced, and more channel resource and transmission power are allocated to the data transmission, thereby improving the code rate and the coverage of the channel.

In a possible implementation of the present disclosure, in response to the first data transmission device being a data sending device, the data sending device may further determine, according to a state of the sharing of the DMRS, a specific position where the DMRS is inserted, so as to ensure the reliability of the data transmission.

Another method for transmitting data provided in the embodiments of the present disclosure is further described below with reference to FIG. 4.

FIG. 4 is a flowchart of a method for transmitting data provided by the embodiments of the present disclosure, which is performed by the first data transmission device, where the first data transmission device is a data sending device.

As shown in FIG. 4, the method for transmitting data includes the following operations.

In block 201, it is determined that the DMRS is shared during the data transmission process according to the trigger condition.

In the embodiments of the present disclosure, the operation in block 201 may be implemented according to any one of the embodiments of the present disclosure, which will not be elaborated here.

In block 202, in response to the DMRS being not shared between one actual repetition of actual repetitions and any other actual repetitions of the actual repetitions in a data bearer, the DMRS is inserted into the one actual repetition of the actual repetitions.

In the embodiments of the disclosure, in response to the DMRS being not shared between one repetition and any other actual repetitions of the actual repetitions in the data bearer, that is, the one actual repetition should correspond to a DMRS alone, the DMRS may be inserted into a symbol position corresponding to this actual repetition by the data sending device, such that the data receiving device may demodulate the actual repetition according to the DMRS in the actual repetition, thereby ensuring the reliability of the data transmission of the actual repetition.

Further, the DMRS may be inserted by the data sending device at a position where an intermediate symbol of the actual repetitions is located. That is, in a possible implementation of the embodiments of the present disclosure, the operation in block 202 may include: determining a position of an intermediate symbol of the one actual repetition according to the number of symbols included in the one actual repetition; and inserting the DMRS at the position where the intermediate symbol of the one actual repetition is located.

As a possible implementation, in response to determining that it is needed to insert the DMRS in the one actual repetition, the data sending device determines the number of symbols included in the actual repetition, determine the position where the intermediate symbol of the actual repetition is located according to the number of symbols included in the actual repetition, and insert the DMRS corresponding to the actual repetition at the position where the intermediate symbol of the actual repetition is located.

As an example, the DMRS occupies one symbol. In this case, in response to the number n of symbols included in the actual repetition being an odd number, the DMRS may be inserted at a position where the intermediate symbol (i.e., an $((n+1)/2)^{th}$ symbol) of the actual repetition is located. For example, the number of symbols included in the actual repetition is 7, the DMRS may be inserted at a position where the $4^{th}$ symbol of the actual repetition is located. In response to the number of symbols included in the actual repetition being an even number, the DMRS may be inserted at a position where an $(n/2)^{th}$ symbol or an $(n/2+1)^{th}$ symbol of the actual repetition is located. For example, the number of symbols included in the actual repetition is 8, the DMRS may be inserted at a position where a $4^{th}$ symbol of the actual repetition is located, or the DMRS may be inserted at a position where a $5^{th}$ symbol of the actual repetition is located.

As an example, the DMRS occupies 2-3 symbols according to actual service requirements, and the following detailed description is made with the example that the DMRS occupies 2 symbols. In response to the number n of symbols included in the actual repetition being an odd number, the DMRS may be inserted at a position where an $((n+1)/2)^{th}$ symbol and an $((n+1)/2-1)^{th}$ symbol of the actual repetition are located, or the DMRS may be inserted at a position where an $((n+1)/2)^{th}$ symbol and an $((n+1)/2+p)^{th}$ symbol of the actual repetition are located. For example, the number of symbols included in the actual repetition is 7, the DMRS may be inserted at the position where the $3^{rd}$ and $4^{th}$ symbols of the actual repetition are located, or the DMRS may be inserted at the position where the $4^{th}$ and $5^{th}$ symbols of the actual repetition are located. In response to the number of symbols included in the actual repetition being an even number, the DMRS may be inserted at a position where an $(n/2)^{th}$ symbol and an $(n/2+p)^{th}$ symbol of the actual repetition are located. For example, the number of symbols included in the actual repetition is 8, the DMRS may be inserted at the position where the $4^{th}$ and $5^{th}$ symbols of the actual repetition are located, as shown in FIG. 2 as Rep1.

According to the method for transmitting data provided by the present disclosure, it is determined that the DMRS is shared during the data transmission process according to the trigger condition, and further, in response to the DMRS being not shared between one actual repetition of actual repetitions and any other actual repetitions in a data bearer, the DMRS is inserted into the one actual repetition of the actual repetitions. Therefore, during the data transmission process, on the basis of the preset trigger condition, it triggers at an appropriate time that the DMRS is shared by the plurality of actual repetitions, such that the consumption caused by the DMRS is reduced, and the specific position of inserting the DMRS is determined according to the situation of the DMRS sharing among the actual repetitions. In this case, not only more channel resource and transmission power are allocated to the data transmission, thus improving the code rate and the coverage of the channel, but also the reliability of the data transmission is improved.

In a possible implementation of the present disclosure, the DMRS sharing mechanism may be enabled or disabled via an indication message, to enhance flexibility and availability of the sharing of the DMRS. FIG. 5 and FIG. 6 shows details with the first data transmission device being a data sending device and a data receiving device, respectively.

A further method for transmitting data provided by the embodiments of the present disclosure will be described with reference to FIG. 5.

FIG. 5 is a flowchart of a method for transmitting data provided by the embodiments of the present disclosure. The method is performed by the first data transmission device, and the first data transmission device is the data sending device.

As shown in FIG. 5, the method for transmitting data includes the following operation.

In block 301, in response to acquiring an indication message for starting a DMRS sharing mechanism sent by a data receiving device, the DMRS sharing mechanism is started, so as to determine that the DMRS is shared during the data transmission process according to the trigger condition.

In the embodiments of the present disclosure, the data sending device may start the DMRS sharing mechanism during the data transmission process only when knowing that the data receiving device has the capability of demodulating the repetitions sharing the DMRS, so as to ensure the reliability of the data transmission and the flexibility for sharing the DMRS.

As a possible implementation, in response to the data receiving device itself having the capability of demodulating the repetition for sharing the DMRS, or requiring the plurality of repetitions to perform that the DMRS is shared according to current service requirements, the data receiving device may send the indication message for starting the DMRS sharing mechanism to the data sending device, such that in response to obtaining the indication message for starting the DMRS sharing mechanism sent by the data receiving device, the data sending device may start the DMRS sharing mechanism, and in response to meeting the trigger condition, the data sending device may share the DMRS during the data transmission process.

Further, in response to that the data receiving device does not have the capability of demodulating the repetitions sharing the DMRS, or determines, according to current service requirements, that it does not need the plurality of repetitions to share the DMRS, the data receiving device may send an indication message for not starting the DMRS sharing mechanism to the data sending device. In this case, in response to acquiring the indication message for not starting the DMRS sharing mechanism sent by the data receiving device, the data sending device will not start the DMRS sharing mechanism, or will turn off the DMRS sharing mechanism, and no longer trigger the sharing of the DMRS during the data transmission process.

It should be noted that in actual applications, since the base station usually occupies a dominant position during the data transmission process between the base station and the UE, the base station may decide whether to start a certain mechanism on its own without notifying the UE, and the UE usually needs to report its own state to the base station. Moreover, since various capabilities of the base station are generally higher than those of the UE, in order to ensure that the data transmitted or the transmission mode used by both parties during the data transmission process will not exceed the capability of the UE, the UE may report its own capability information to the base station. Accordingly, in the embodiments of the present disclosure, the solution of indicating the data sending device to start or not start the DMRS sharing mechanism via the indication message may be applied to an application scenario where the data sending device is the base station and the data receiving device is the UE. In a scenario where the base station is the data receiving device and the UE is the data sending device, the base station can start or not start the DMRS sharing mechanism without notifying the UE.

In the embodiments of the present disclosure, the operation in block 301 may be implemented according to any one of the embodiments of the present disclosure, which will not be elaborated here.

According to the method for transmitting data provided by the present disclosure, in response to acquiring the indication message for starting the DMRS sharing mechanism sent by the data receiving device, the data sending device starts the DMRS sharing mechanism to determine whether to share the DMRS during the data transmission process according to the trigger condition. Therefore, the DMRS sharing mechanism is started or turned off according to the indication message, and the plurality of actual repetitions are triggered at an appropriate time to share the DMRS according to the preset trigger condition during the data transmission process, such that consumption caused by the DMRS is reduced. In this case, not only more channel resource and transmission power are allocated to the data transmission, thus improving the code rate and the coverage of the channel, but also the reliability of the data transmission is improved.

A further method for transmitting data provided by the embodiments of the present disclosure will be described with reference to FIG. 6.

FIG. 6 is a flowchart of a method for transmitting data provided by the embodiments of the present disclosure. The method is performed by the first data transmission device, and the first data transmission device is a data receiving device.

As shown in FIG. 6, the method for transmitting data includes the following operations.

In block 401, the indication message for starting the DMRS sharing mechanism is sent to the data sending device.

In the embodiments of the present disclosure, the data receiving device may start the DMRS sharing mechanism during the data transmission process only when the data receiving device has the capability of demodulating the repetitions sharing the DMRS, so as to ensure the reliability of the data transmission and the flexibility for sharing the DMRS.

As a possible implementation, in response to the data receiving device having the capability of demodulating the repetition sharing the DMRS, or the need for the plurality of repetitions to share the DMRS according to current service requirements, the data receiving device may send the indication message for starting the DMRS sharing mechanism to the data sending device, to instruct the data sending device to start the DMRS sharing mechanism.

Further, in response to that the data receiving device does not have the capability of demodulating the repetition for sharing the DMRS, or does not have the need for the plurality of repetitions to share the DMRS according to the current service requirements, the data receiving device may send the indication message for not starting the DMRS sharing mechanism to the data sending device, to instruct the data sending device not to start the DMRS sharing mechanism or turn off the DMRS sharing mechanism, and no longer trigger the sharing of the DMRS during the data transmission process.

It should be noted that in actual applications, since the base station usually occupies a dominant position during the data transmission process between the base station and the UE, the base station may decide whether to start a certain mechanism on its own without notifying the UE, and the UE usually needs to report its own state to the base station. Moreover, since various capabilities of the base station are generally higher than those of the UE, in order to ensure that the data transmitted or the transmission mode used by both parties during the data transmission process will not exceed the capability of the UE, the UE may report its own capability information to the base station. Accordingly, in the embodiments of the present disclosure, the solution of indicating the data sending device to start or not start the DMRS sharing mechanism via the indication message may be applied to an application scenario where the data sending device is the base station and the data receiving device is the UE. In a scenario where the base station is the data receiving device and the UE is the data sending device, the base station can start or not start the DMRS sharing mechanism without notifying the UE.

In block 402, it is determined that the DMRS is shared during the data transmission process according to the trigger condition.

In the embodiments of the present disclosure, the operation in block 402 may be implemented according to any one of the embodiments of the present disclosure, which will not be elaborated here.

According to the method for transmitting data provided by the present disclosure, the indication message for starting the DMRS sharing mechanism is sent to the data sending device, and it is determined whether to share the DMRS during the data transmission process according to the trigger condition. Therefore, the DMRS sharing mechanism is started or turned off according to the indication message, and the plurality of actual repetitions are triggered at an appropriate time to share the DMRS according to the preset trigger condition during the data transmission process, such that the consumption caused by the DMRS is reduced. In this case, not only more channel resource and transmission power are allocated to the data transmission, thus improving the code rate and the coverage of the channel, but also the reliability of the data transmission is improved.

In order to implement the foregoing embodiments, the present disclosure further provides an apparatus for transmitting data.

FIG. 7 is a schematic diagram illustrating an apparatus for transmitting data provided by the embodiments of the present disclosure. The apparatus is applied to a first data transmission device.

As shown in FIG. 7, the apparatus 70 for transmitting data includes: a first determining module 71 configured to determine that a DMRS is shared during a data transmission process according to a trigger condition.

In actual applications, the apparatus for transmitting data provided by the embodiments of the present disclosure may be configured in any communication device to perform the aforementioned method.

According to the apparatus for transmitting data provided by the present disclosure, it is determined whether to share the DMRS during the data transmission process according to the trigger condition. Therefore, the plurality of actual repetitions are triggered at an appropriate time to share the DMRS according to the preset trigger condition during the data transmission process, such that the consumption caused by the DMRS is reduced, more channel resource and transmission power are allocated to the data transmission, thus improving the code rate and the coverage of the channel.

In a possible implementation of the present disclosure, the apparatus 70 for transmitting data further includes: a second determining module configured to determine that the DMRS is not shared during the data transmission process in response to not meeting the trigger condition.

Further, in another possible implementation of the present disclosure, the first determining module 71 includes: a first determining unit configured to, in response to a same nominal repetition including a plurality of actual repetitions in the data transmission process, determine that the DMRS is shared by the plurality of actual repetitions.

Further, in still another possible implementation of the present disclosure, the first determining module includes: a second determining unit configured to, in response to a plurality of consecutive adjacent actual repetitions in the data transmission process having a length less than or equal to a specified length, determine that the DMRS is shared by the plurality of consecutive adjacent actual repetitions.

Further, in a further possible implementation of the present disclosure, the length of the plurality of actual repetitions is indicated by any one of a length of symbols, a total length of sub-slots, and a total length of slots included in the plurality of actual repetitions.

Further, in a further possible implementation of the present disclosure, the trigger condition includes at least one of: a user equipment (UE) being in a specified state, a type of data repetition being a specified type, a channel quality indicator (CQI) being in a first specified range, a signal-to-noise ratio (SNR) being in a second specified range, and a frequency hopping not occurring in a data transmission channel.

Further, in a further possible implementation of the present disclosure, the device 70 for transmitting data further includes: a third determining unit configured to determine the trigger condition according to indication information sent by a second data transmission device. The second data transmission device is a device performing data interaction with the first data transmission device.

Further, in a further possible implementation of the present disclosure, the indication information is any one of following types of information: radio resource control (RRC) information, a media access control layer (MAC) control element (CE) and downlink control information (DCI).

Further, in a further possible implementation of the present disclosure, the first data transmission device is a data sending device, and the device further includes: an inserting module configured to, in response to the DMRS being not shared between one actual repetition of actual repetitions and any other actual repetitions of the actual repetitions in a data bearer, insert the DMRS into the one actual repetition.

Further, in a further possible implementation of the present disclosure, the inserting module further includes: a third determining unit configured to determine a position of an intermediate symbol of the one actual repetition according to the number of symbols included in the one actual repetition; and an inserting unit configured to insert the DMRS at the position where the intermediate symbol of the one actual repetition is located.

Further, in a further possible implementation of the present disclosure, the first determining module 71 includes: a starting unit configured to, in response to acquiring an indication message for starting a DMRS sharing mechanism sent by a data receiving device, start the DMRS sharing mechanism, so as to determine that the DMRS is shared during the data transmission process according to the trigger condition.

Further, in a further possible implementation of the present disclosure, the first data transmission device is a data receiving device, and the device 70 further includes: a sending module configured to send an indication message for starting a DMRS sharing mechanism to a data sending device.

It should be noted that the foregoing explanations for the method for transmitting data of the embodiments shown in FIG. 1, FIG. 4, FIG. 5, and FIG. 6 are also applicable to the embodiments of the apparatus 70 for transmitting data, and will not be elaborated here.

According to the apparatus for transmitting data provided by the present disclosure, it is determined that the DMRS is shared during the data transmission process according to the trigger condition, and in response to the DMRS being not shared between one actual repetition and any other actual repetitions of all the actual repetitions in the data bearer, the DMRS is inserted into the one actual repetition. Therefore, the plurality of actual repetitions are triggered at an appropriate time to share the DMRS according to the preset trigger condition during the data transmission process, such that the consumption caused by the DMRS is reduced, and the specific position of inserting the DMRS is determined according to the situation of the DMRS sharing among the actual repetitions. In this case, not only more channel resource and transmission power are allocated to the data transmission, thus improving the code rate and the coverage of the channel, but also the reliability of the data transmission is improved.

In order to implement the foregoing embodiments, the present disclosure further provides a data transmission device.

The data transmission device provided by the embodiments of the present disclosure includes a processor, a transceiver, a memory stored thereon a program that is executable by the processor. The processor is configured to execute the executable program to perform the method for transmitting data provided by any of the aforementioned technical solutions.

The data transmission device may be the aforementioned first data transmission device, and the first data transmission device may be a UE or a base station.

The processor may include various types of storage media that are non-transitory computer storage media that may continue to keep the information stored thereon after the data transmission is powered down. Herein, the data transmission device includes the UE or the base station.

The processor may be coupled to the memory through a bus or the like, and is configured to read the executable program stored on the memory to implement the method as described above, for example, the method as shown in at least one of FIG. 1, FIG. 4, FIG. 5, and FIG. 6.

In order to implement the above embodiments, the present disclosure further provides a non-transitory computer-readable storage medium.

The non-transitory computer-readable storage medium provided by the embodiments of the present disclosure has stored thereon an executable program that, when executed by a processor, causes the processor to implement the method for transmitting data according to any of the aforementioned technical solutions, for example, the method as shown in at least one of FIG. 1, FIG. 4, FIG. 5 and FIG. 6.

Figure 8:
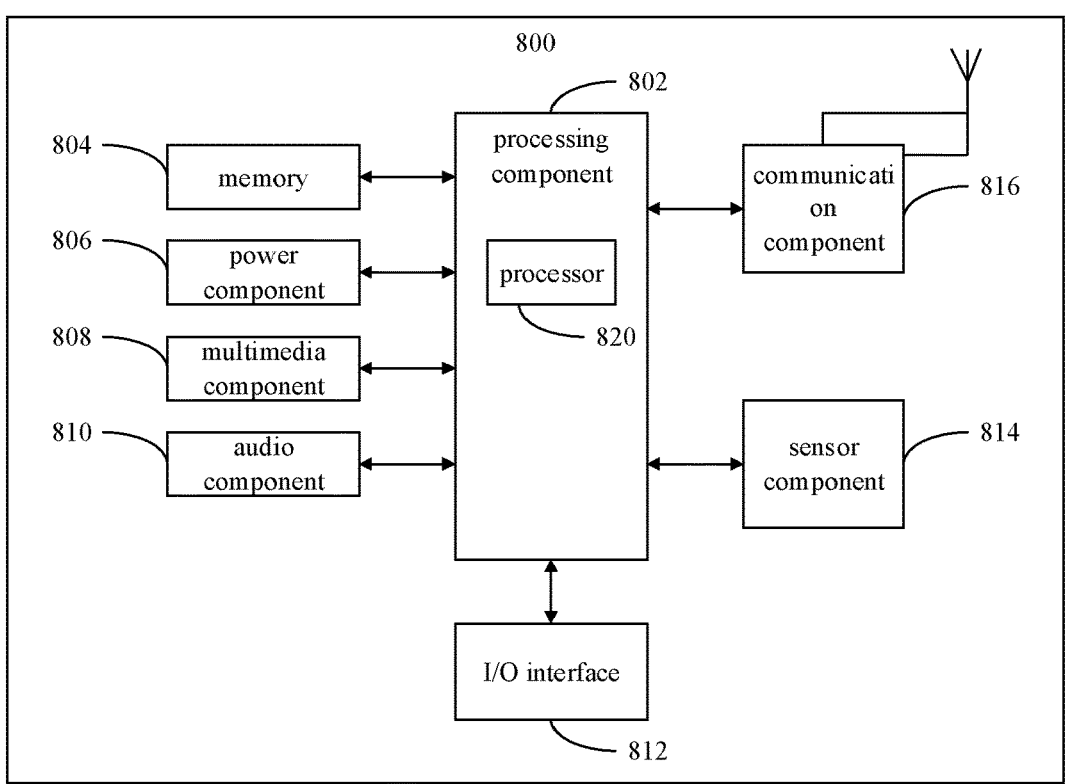
FIG. 8 is a block diagram illustrating a user equipment provided by embodiments of the present disclosure.

FIG. 8 is a block diagram of a UE 800 provided by the embodiments of the present disclosure. For example, the UE 800 may be a mobile phone, a computer, a digital broadcast terminal, a messaging device, a gaming console, a tablet, a medical device, an exercise equipment, a personal digital assistant, and the like.

Referring to FIG. 8, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to execute instructions to perform all or some of the steps in the above-described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the UE 800. Examples of such data include instructions for any disclosures or methods operated on the UE 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the UE 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as keyboards, click wheels, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an turned on/off status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging disclosures. In some embodiments, the sensor component 814 may also include an accelerometer sensor, a gyroscope sensor, a magnetic sensor, a pressure sensor, or a temperature sensor.

The communication component 816 is configured to facilitate communication, wired or wireless, between the UE 800 and other devices. The UE 800 may access a wireless network according to a communication standard, such as WiFi, 2G, or 3G, or a combination thereof. In one illustrative embodiment, the communication component 816 receives a broadcast signal or broadcast associated information from an external broadcast management system via a broadcast channel. In one illustrative embodiment, the communication component 816 further includes a near field communication (NFC) module to facilitate short-range communications. For example, the NFC module may be implemented according to a radio frequency identification (RFID) technology, an infrared data association (IrDA) technology, an ultra-wideband (UWB) technology, a Bluetooth (BT) technology, and other technologies.

In some embodiments, the UE 800 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In some embodiments, there is also provided a non-transitory computer-readable storage medium including instructions, such as included in the memory 804, executable by the processor 820 in the UE 800, for performing the above-described methods. For example, the non-transitory computer-readable storage medium may be a ROM, a RAM, a CD-ROM, a magnetic tape, a floppy disc, an optical data storage device, and the like.

Figure 9:
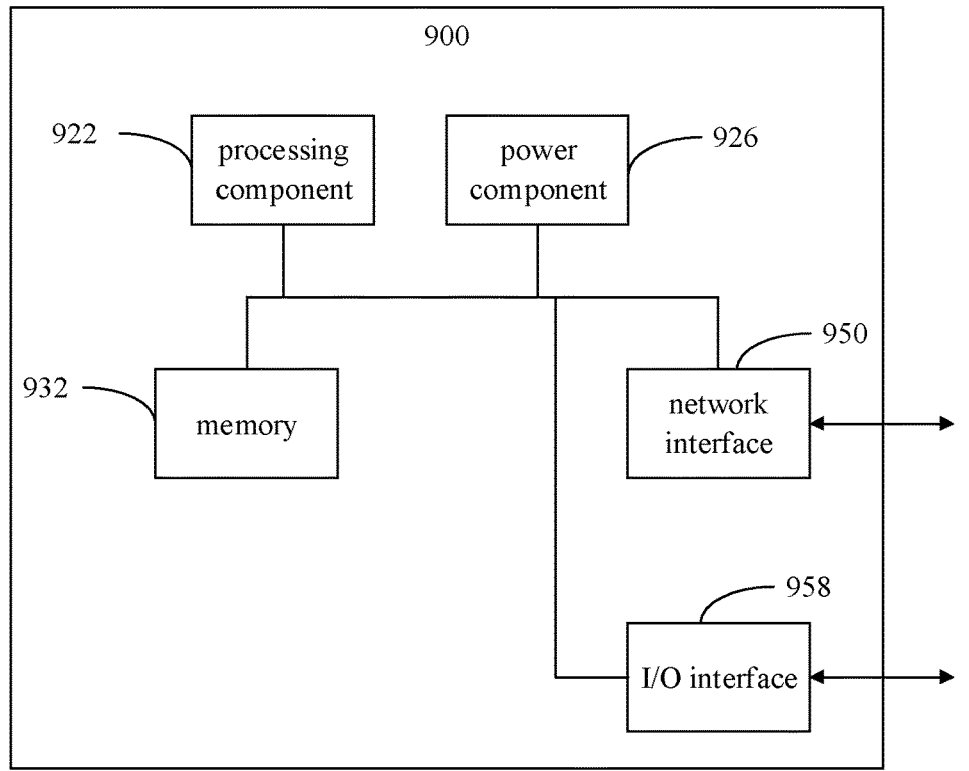
FIG. 9 is a schematic diagram illustrating a base station provided by embodiments of the present disclosure.

FIG. 9 is a schematic diagram of a base station provided by the embodiments of the present disclosure. For example, the base station 900 may be provided as a network device. As shown in FIG. 9, the base station 900 includes a processing component 922, which further includes at least one processor, and a memory resource represented by a memory 932 for storing instructions executable by the processing component 922, such as an application program. The application program stored in the memory 932 may include one or more modules. Each module corresponds a set of instructions. Further, the processing component 922 is configured to execute instructions, so as to execute any of the aforementioned methods, e.g., the methods shown in FIG. 1, FIG. 4, FIG. 5 and FIG. 6, applied to the base station.

The base station 900 may further include a power component 926 configured to perform power management of the base station 900, a wired or wireless network interface 950 configured to couple the base station 900 to a network, and an input/output (I/O) interface 958. The base station 900 may perform operations according to an operating system stored in the memory 932, such as Windows Server™, Mac OS X™, Unix™, Linux™, FreeBSD™, or the like.

Other embodiments of the disclosure will be apparent to those skilled in the art from consideration of the specification and practice of the disclosure disclosed herein. This disclosure is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and various modifications and changes can be made without departing from the scope thereof. The scope of the present disclosure is only limited by the appended claims.

What is claimed is:

1. A method for transmitting data, performed by a first data transmission device and comprising:

determining that a demodulation reference signal (DMRS) is shared during a data transmission process according to a trigger condition;

wherein determining that the DMRS is shared during the data transmission process according to the trigger condition comprises:

in response to a plurality of consecutive adjacent actual repetitions in the data transmission process having a length less than or equal to a specified length, determining that the DMRS is shared by the plurality of consecutive adjacent actual repetitions;

wherein the length of the plurality of consecutive adjacent actual repetitions is indicated by any one of a total length of sub-slots, and a total length of slots.

2. The method of claim 1, further comprising:

in response to not meeting the trigger condition, determining that the DMRS is not shared during the data transmission process.

3. The method of claim 1, wherein determining that the DMRS is shared during the data transmission process according to the trigger condition comprises:

in response to a same nominal repetition comprising a plurality of actual repetitions in the data transmission process, determining that the DMRS is shared by the plurality of actual repetitions.

4. The method of claim 1, wherein the trigger condition comprises at least one of: a user equipment (UE) being in a specified state, a type of data repetition being a specified type, a channel quality indicator (CQI) being in a first specified range, a signal-to-noise ratio (SNR) being in a second specified range, and a frequency hopping not occurring in a data transmission channel.

5. The method of claim 1, further comprising:

determining the trigger condition according to indication information sent by a second data transmission device, wherein the second data transmission device is a device performing data interaction with the first data transmission device.

6. The method of claim 5, wherein the indication information is any one of following types of information: radio resource control (RRC) information, a media access control layer (MAC) control element (CE) and downlink control information (DCI).

7. The method of claim 1, wherein the first data transmission device is a data sending device, and the method further comprises:

in response to the DMRS being not shared between one actual repetition of actual repetitions and any other actual repetitions of the actual repetitions in a data bearer, inserting the DMRS into the one actual repetition of the actual repetitions.

8. The method of claim 7, wherein inserting the DMRS into the one actual repetition comprises:

determining a position of an intermediate symbol of the one actual repetition according to a number of symbols comprised in the one actual repetition; and inserting the DMRS at the position where the intermediate symbol of the one actual repetition is located.

9. The method of claim 7, wherein determining that the DMRS is shared during the data transmission process according to the trigger condition comprises:

in response to acquiring an indication message for starting a DMRS sharing mechanism sent by a data receiving device, starting the DMRS sharing mechanism so as to determine that the DMRS is shared during the data transmission process according to the trigger condition.

10. The method of claim 1, wherein the first data transmission device is a data receiving device, and the method further comprises:

sending an indication message for starting a DMRS sharing mechanism to a data sending device.

11. A first data transmission device, comprising:

a transceiver;

a memory;

a processor, coupled to the transceiver and the memory, and configured to control the transceiver to send or receive a wireless signal and implement a method for transmitting data by executing computer-executable instructions stored on the memory, wherein the method comprises:

determining that a DMRS is shared during a data transmission process according to a trigger condition;

wherein determining that the DMRS is shared during the data transmission process according to the trigger condition comprises:

in response to a plurality of consecutive adjacent actual repetitions in the data transmission process having a length less than or equal to a specified length, determining that the DMRS is shared by the plurality of consecutive adjacent actual repetitions;

wherein the length of the plurality of consecutive adjacent actual repetitions is indicated by any one of a total length of sub-slots, and a total length of slots.

12. The first data transmission device of claim 11, wherein the method further comprises:

in response to not meeting the trigger condition, determining that the DMRS is not shared during the data transmission process.

13. The first data transmission device of claim 11, wherein determining that the DMRS is shared during the data transmission process according to the trigger condition comprises:

in response to a same nominal repetition comprising a plurality of actual repetitions in the data transmission process, determining that the DMRS is shared by the plurality of actual repetitions.

14. The first data transmission device of claim 11, wherein the trigger condition comprises at least one of: a user equipment (UE) being in a specified state, a type of data repetition being a specified type, a channel quality indicator (CQI) being in a first specified range, a signal-to-noise ratio (SNR) being in a second specified range, and a frequency hopping not occurring in a data transmission channel.

15. The first data transmission device of claim 11, the method further comprises:

determining the trigger condition according to indication information sent by a second data transmission device, wherein the second data transmission device performs data interaction with the first data transmission device.

16. A non-transitory computer-readable storage medium having stored therein computer-executable instructions that, when executed by a processor, cause the processor to implement a method for transmitting data, the method comprising:

determining that a DMRS is shared during a data transmission process according to a trigger condition;

wherein determining that the DMRS is shared during the data transmission process according to the trigger condition comprises:

in response to a plurality of consecutive adjacent actual repetitions in the data transmission process having a length less than or equal to a specified length, determining that the DMRS is shared by the plurality of consecutive adjacent actual repetitions;

wherein the length of the plurality of consecutive adjacent actual repetitions is indicated by any one of a total length of sub-slots, and a total length of slots.

* * * * *